J. B. ROSA.
TILE MAKING APPARATUS.
APPLICATION FILED OCT. 8, 1921.
1,433,417.
Patented Oct. 24, 1922.
2 SHEETS—SHEET 1.
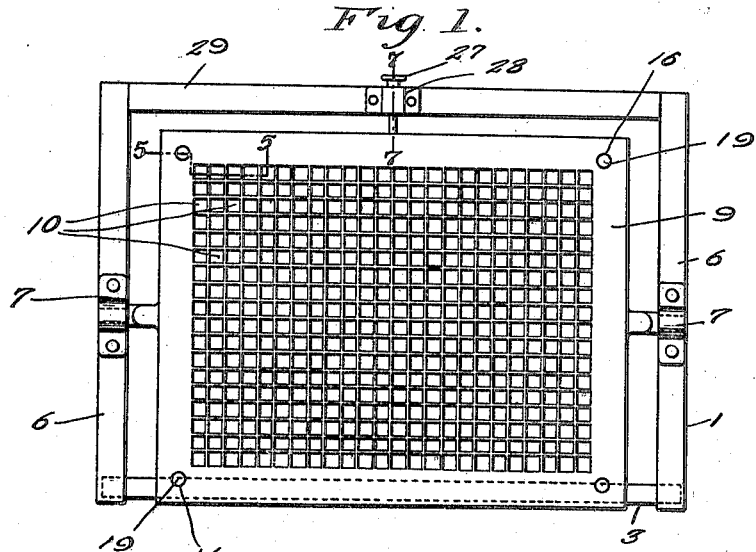
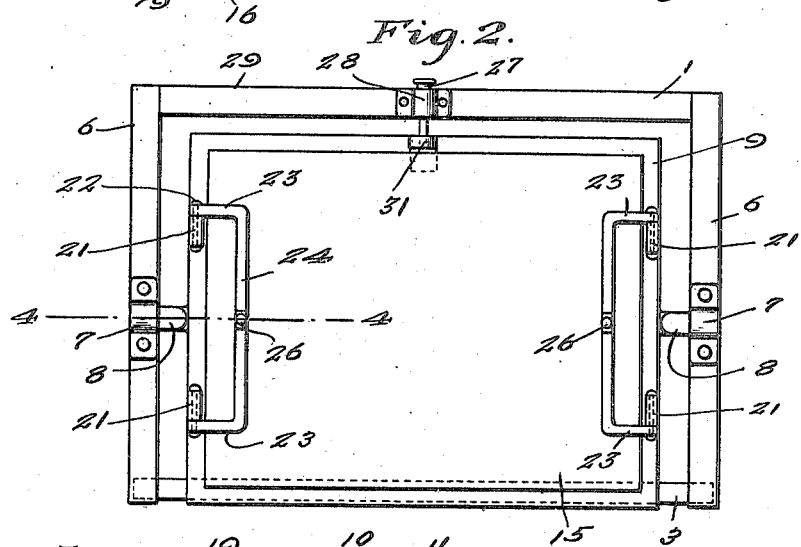
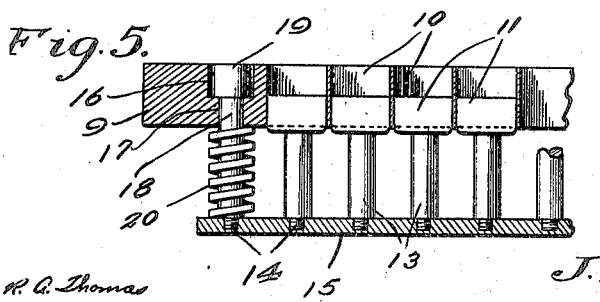
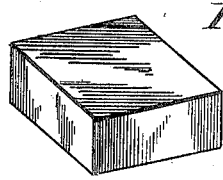
J. B. Rosa INVENTOR
BY *Victor J. Evans*
ATTORNEY

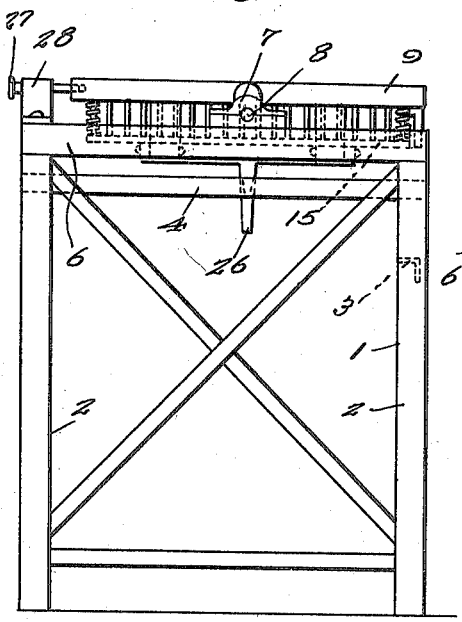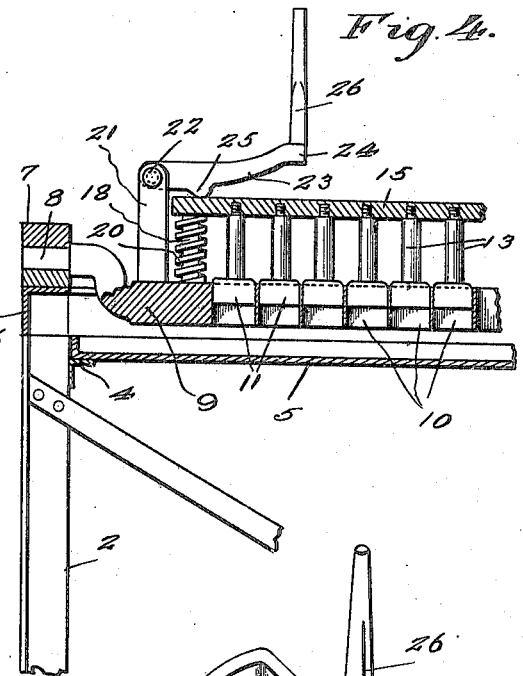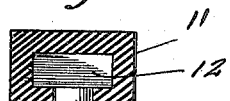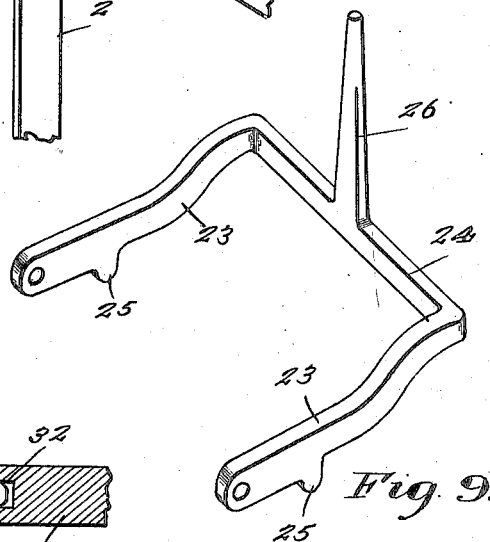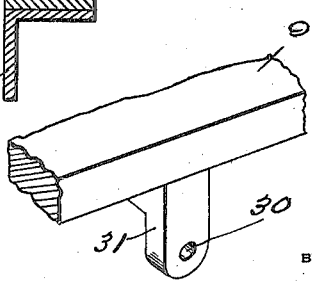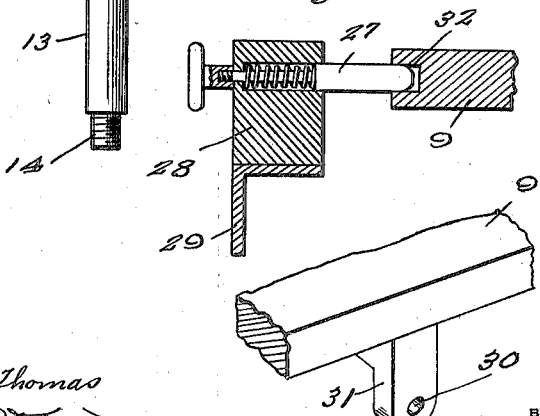

Patented Oct. 24, 1922.

1,433,417

UNITED STATES PATENT OFFICE.

JOHN B. ROSA, OF DETROIT, MICHIGAN.

TILE-MAKING APPARATUS.

Application filed October 8, 1921. Serial No. 506,516.

*To all whom it may concern:*

Be it known that I, JOHN B. ROSA, a citizen of the United States, residing at Detroit, in the county of Wayne and State of Michigan, have invented new and useful Improvements in Tile-Making Apparatus, of which the following is a specification.

My present invention has reference to a tile making machine.

My object is to simplify and improve the existing art by producing an apparatus whereby tiles may be cast and molded in an expeditious manner, in a uniform shape, and at the least amount of physical exertion.

A further object is to produce a tile making apparatus in which the mold is divided by partitions into a series of uniform cells, the bottom of each cell being closed by a plunger head which also regulates the depth of the cell, and consequently the thickness of the tile when cast in the cell, said mold being pivotally supported whereby the same may be arranged to permit the pouring of the plastic material into the cells, the troweling or scraping of the surplus material from the top of the mold and to also permit of the arrangement of the usual paper sheet over the tiles, said mold being thereafter turned upon its pivots so that the plungers will be arranged at the top of the device, and means is provided for simultaneously operating all of the plungers to eject all of the tiles from the cells and to deposit the same on a removable tray that is provided for their reception.

A still further object is to produce a molding apparatus for tiles in which the mold is formed with any desired number of cells similarly or differently shaped, in accordance with the shape of the tile to be produced, each of said cells being closed by a plunger, all of the plungers having stems secured to a plate or board, spring influenced means being arranged between the plate or board and the mold for holding all of the plungers in aligning position in the respective cells so that all of the tile will be cast at a determined thickness, the mold being pivotally supported on a suitable table which permits of the turning thereof to bring the open faces of the cells to a position to receive the plastic material, means being provided for holding the mold in such position which when released allows the turning of the mold on its pivots to bring the plunger supporting board or plate to the top of the table, means being provided for locking the mold in such position, while means are pivotally supported from the mold and arranged over the plunger carrying plate or board which, when brought to one position will influence the board against the mentioned spring means and cause all of the plungers to be simultaneously moved through the respective cells to eject the molded tiles from the cells on to a pan which is removably supported on the table, the movement of the plungers in ejecting direction being limited by the spring influenced supporting means for the board or plate when the latter is brought into contacting engagement with the pan.

The foregoing, and many other objects which will appear as the nature of the invention is better understood, may be accomplished by a construction, combination and operative association of parts, such as is disclosed by the drawings which accompany and which form part of this specification.

In the drawings:—

Figure 1 is a plan view of the improvement, the mold being arranged to receive the plastic material in the cells thereof.

Figure 2 is a similar view but showing the mold turned on its pivots to a position for the ejection of the tile from the mold cells.

Figure 3 is an end elevation of the device in the position illustrated in Figure 1.

Figure 4 is a fragmentary enlarged sectional view approximately on the line 4—4 of Figure 2.

Figure 5 is an enlarged fragmentary sectional view approximately on the line 5—5 of Figure 1.

Figure 6 is an elevation of one of the plungers, the head therefor being in section.

Figure 7 is a fragmentary sectional view on an enlarged scale and approximately on the line 7—7 of Figure 1.

Figure 8 is a fragmentary perspective view showing the socket carried by the mold within which the spring influenced latch is received for holding the mold in an inverted position on the table, as disclosed in Figures 2 and 4 of the drawings.

Figure 9 is a perspective view of one of the levers employed for ejecting the tile from the mold cells.

Figure 10 is a perspective view of one of the tiles produced by the apparatus.

As disclosed by the drawings, I make use of a frame or table which is broadly indicated by the numeral 1. The legs of this table are suitably braced, and what I will term the front of the frame or table, is open at the top thereof. The legs 2, at the front of the table are, however, suitably supported by a transverse angle brace 3 and the front and rear legs, adjacent to the top of the table are connected by an angle brace 4 which also provides a rest or support for the removable tile receiving tray 5. The tray 5 is not in position when the mold is positioned to receive the plastic material.

The side or end members 6 at the top of the frame or table have centrally secured thereto upstanding brackets 7, and journaled in suitable openings in these brackets are trunnions 8 which have their outer ends offset and either integrally formed with or secured to the mold board 9. The mold board may be in the nature of a frame, the inner edges of which being connected with both longitudinal and transverse strips or partitions, or the said mold board may be integrally formed with cells 10. The size and shape of the cells vary in accordance with the size and shape of the tile cast in the mold, in the showing of the drawings the cells being square in plan, and the said cells extend entirely through the mold board.

From the bottom of the mold 9 there is received in each cell 10 a plunger. Each plunger comprises a hollow rubber body 11 that has received therein a head 12 formed on one end of a stem or rod 13. Each stem or rod 13 is of the same length and has its outer end reduced and threaded, as at 14. The threaded ends of the plunger stems or rods are received in threaded openings in a board or plate 15. This plate is of a size only slightly less than that of the mold, and the said mold is provided, at its corners with sockets 16 that centrally communicate with openings 17 through which pass stems 18. Each stem has a head 19 that is received in a socket 16, and the opposite end of each stem is threaded and is received in a threaded opening in the board or plate 15. The heads 18 may have compressible facings, and the stems 18 of each head are surrounded by a spring 20 which exerts a pressure between the board or plate 15 and the mold 9. This pressure causes the heads 19 to contact with the inner walls of the sockets 16, and the springs also influence the stems of the plungers 11. The faces of the plungers which receive the plastic material from which the tile is molded are arranged in the same line, with the result that all of the tiles will be of the same thickness.

On the mold 9, outwardly from the ends of the plate 15 there are secured spaced plates or brackets 21 respectively, the said brackets having ears at their outer ends for receiving therein pivots 22 which hingedly connect to the brackets the parallel arms 23 of substantially U-shaped members 24. The arms 23, upon their edges opposite the plate 15 are provided with lugs 25, and the connecting element for the arms of each of the U-shaped members is provided with an outstanding portion forming the same with a handle 26. It will be apparent that when the plate 15 is arranged in the position illustrated in Figure 2 of the drawings that an inward and downward pull on the handles 26 of the members 24 will cause the lugs 25 to contact with the plate 15 to move the same bodily in the direction of the mold, and consequently force the plungers 11 through the cells of the mold and thus eject the set or partly set tiles from the cells on to the tray 5. The mold 9 and the plate 15 are held in position to permit of the proper ejection of the tiles through the medium of a spring influenced latch 27 supported in a suitable bracket 28 on the upper end member 29 of the frame 1, the said latch engaging in a socket 30 secured upon a bracket 31 to the mold board.

The open faces of the cells are arranged in the position illustrated in Figures 1 and 3 of the drawings, when the plastic material is to be inserted therein. This is accomplished by merely swinging the mold board and the plate 15, which is at all times attached thereto by the yieldable means above described, on the trunnions. When in such position, the spring influenced latch 27 is received in a socket 32 formed in the mold 9. The latch 27, it will be thus noted, provides a means for effectively supporting the mold board in either of its referred to positions. The plastic material is poured in the cells in the usual manner, and the surplus material is troweled or scraped off of the upper face of the mold board. Thereafter, moistened paper is arranged on the tiles and the same are permitted to partly set. When sufficiently set the latch 27 is released and the mold and the plunger carrying plate are turned on the trunnions so that the plunger carrying plate will be arranged uppermost, and the open ends of the cells disposed directly over the tray 5. As previously stated, the tray 5 is removed when the mold board is turned. The set tiles, received on the tray are removed for further drying, and another tray is arranged close to the apparatus for use in receiving other tiles. The operation is repeated as above described, and it is thought that the foregoing description, when taken in connection with the drawings will fully set forth the construction, operation and advantages of the improvement. The nature of the invention is such as to render the same susceptible to various changes and modifications than those herein set forth, and therefore it is to be understood that while the showing and description disclose a satisfactory embodiment of the improvement as it now appears to me, I may at a future date make all such changes therefrom as I am entitled to within the scope of the appended claim.

Having described the invention, I claim:—

In a tile molding apparatus, a frame, a mold board having cells therethrough pivotally supported on the frame, means for latching the mold board in horizontal position on the frame, an elastic plunger in each cell, a stem therefor, a plate to which the stems are secured, said mold board having sockets in the ends thereof, headed members received in the sockets, stems on the headed members secured to the plate, springs on the stems exerting a pressure between the mold board and plate, means for latching the mold board to the frame when the same has been turned on its pivots to bring the plate uppermost, a removable pan on the frame to receive molded tiles from the cells, means pivotally secured to the mold board and disposed over the plate comprising members provided with handles, said members having lugs thereon in contacting engagement with the plate whereby when the members are swung to move the plate to cause the plungers to travel through the cells to eject tiles therefrom and to also cause the spring influenced headed members to contact with the pan for limiting such movement of the plungers.

In testimony whereof I affix my signature.

JOHN B. ROSA.